United States Patent
Chung et al.

(10) Patent No.: US 8,224,190 B2
(45) Date of Patent: Jul. 17, 2012

(54) CHANNEL ASSIGNMENT METHOD AND APPARATUS FOR WAVELENGTH-DIVISION-MULTIPLEXED TRANSMISSION SYSTEM

(75) Inventors: Hwan-seok Chung, Daejeon-si (KR); Sun-hyok Chang, Daejeon-si (KR); Sang-soo Lee, Daejeon-si (KR); Kwang-joon Kim, Daejeon-si (KR)

(73) Assignee: Electronics and Telecommunications Research Institute (KR)

( * ) Notice: Subject to any disclaimer, the term of this patent is extended or adjusted under 35 U.S.C. 154(b) by 150 days.

(21) Appl. No.: 12/618,579

(22) Filed: Nov. 13, 2009

(65) Prior Publication Data

US 2010/0158531 A1 Jun. 24, 2010

(30) Foreign Application Priority Data

Dec. 18, 2008 (KR) .................. 10-2008-0129341

(51) Int. Cl.
*H04B 10/04* (2006.01)
(52) U.S. Cl. ........... 398/183; 398/69; 398/79; 398/192; 398/193; 398/194; 398/188; 385/24; 385/37
(58) Field of Classification Search ........... 398/147, 398/81, 158, 79, 159, 148, 149, 183, 192, 398/193, 194, 69, 188, 186; 385/24, 37
See application file for complete search history.

(56) References Cited

U.S. PATENT DOCUMENTS 7,313,325 B2 12/2007 Han et al.
7,693,425 B2 * 4/2010 Vassilieva et al. ............ 398/147
7,991,295 B2 * 8/2011 Vassilieva et al. ............ 398/147

FOREIGN PATENT DOCUMENTS

KR 10-2004-0054109 6/2004

OTHER PUBLICATIONS

Astar, W., et al., "Performance of DBPSK in a 5×10 Gb/s Mixed Modulation Format Raman/EDFA WDM System," *IEEE Photonics Letters*, vol. 17, No. 12, Dec. 2005, pp. 2766-2768.
Chandrasekhar, S., et al., "Impact of Channel Plan and Dispersion Map on Hybrid DWDM Transmission of 42.7-Gb/s DQPSK and 10.7-Gb/s OOK on 50-GHz Grid," *IEEE Photonics Technology Letters*, vol. 19, No. 22, Nov. 15, 2007, pp. 1801-1803.

* cited by examiner

*Primary Examiner* — Hanh Phan
(74) *Attorney, Agent, or Firm* — Blakely, Sokoloff, Taylor & Zafman

(57) ABSTRACT

Provided is a channel assignment method in a wavelength-division-multiplexed transmission system. The channel assignment method includes obtaining information about signal modulation schemes from a plurality of optical transmitters, and assigning channels to the respective optical transmitters in consideration of the obtained information about the signal modulation schemes. Accordingly, in transmission of channels of different modulation formats, cross phase modulation is minimized, thereby reducing inter-channel interference.

13 Claims, 6 Drawing Sheets

CHANNEL ASSIGNMENT METHOD AND APPARATUS FOR WAVELENGTH-DIVISION-MULTIPLEXED TRANSMISSION SYSTEM

CROSS REFERENCE TO RELATED APPLICATION

This application claims the benefit under 35 U.S.C. §119(a) of Korean Patent Application No. 10-2008-0129341, filed on Dec. 18, 2008, the disclosure of which is incorporated by reference in its entirety for all purposes.

BACKGROUND

1. Field

The following description relates to a wavelength-division-multiplexed transmission system, and more particularly, to a channel assignment technology for a wavelength-division-multiplexed transmission system.

2. Description of the Related Art

With the advent of Ethernet-based services such as Internet television services and user created contents (UCC), in recent times Internet traffic has increased considerably and widening of the network is required for such services.

A wavelength-division-multiplexed optical transmission system is regarded as the most efficient scheme to accommodate increases in traffic. In the wavelength-division-multiplexed optical transmission system, a number of wavelengths are multiplexed and transmitted through a single optical fiber. To improve the efficiency of the transmission, transmission rate per wavelength (channel) is increased and a variety of modulation schemes are employed based on high-speed channels.

Signals of 100 Gb/s per wavelength are used to satisfy bandwidth requirements at a given point, such as a high performance computer, a server, a data sensor, an enterprise network, and an Internet switching center, on which data traffic converges. To transmit signals of 100 Gb/s per wavelength, an optical transceiver employs new modulation schemes including phase shift key (PSK) modulation, by which a phase of an optical signal is modulated, and quaternary phase shift key (QPSK), by which two or more bits can be transmitted per symbol, instead of a simple non-return-to-zero (NRZ) scheme or a return-to-zero (RZ) scheme which modulates the amplitude of an optical signal between two levels.

However, in transmission of optical signals of different transmission rates and different to modulation formats through an optical path, significant cross-interference between the optical signals can take place, compared to the transmission of optical signals of the same transmission rate or the same modulation format. In this case, due to the nonlinear phenomenon such as cross-phase-modulation, then amplitude-modulated signals of NRZ or RZ format induce phase noise on phase-modulated signals of PSK or QPSK format, and thus the performance of the optical signal is deteriorated. In particular, since a large amount of data is transmitted at one time by means of the signal of 100 Gb/s per wavelength, the performance of the optical signal primarily needs to ensured.

To this end, conventionally, cumulative dispersion of an optical fiber is not completely compensated for, but several tens of ps/nm are left at each optical amplifier section, so that walk-off between optical signals can be controlled. Accordingly, it is possible to prevent nonlinear phenomena. This conventional method can be used in a point-to-point transmission system. However, since dispersion compensation should be conducted at each channel in a circulation or mesh net in which add/drop of an optical signal can occur at each optical amplifier section, a corresponding receiver is highly complex.

In another conventional channel assignment method, channels of low transmission rates are placed in a long wavelength band, and channels of high transmission rates are placed in a short wavelength band. However, since this method only minimizes performance deterioration by Raman crosstalk, it cannot suppress cross-phase modulation which is the main cause of performance deterioration of a phase-modulated signal, and only takes into account the transmission rate, and hence performance deterioration between channels due to the modulation formats cannot be prevented.

SUMMARY

Accordingly, an object of the present invention is to suppress interference between channels.

Another object of the present invention is to improve transmission performance of channels.

In one general aspect, there is provided a channel assignment method in an optical transmission system in which a plurality of optical signals are transmitted through a single optical fiber using a wavelength-division-multiplexed scheme, the channel assignment method including: obtaining information about signal modulation schemes from a plurality of optical transmitters; and assigning channels to the respective optical transmitters in consideration of the obtained information about the signal modulation schemes.

In the assigning of the channels, the channels may be assigned such that phase-modulated optical signals are placed adjacent to one another.

The channel assignment method may further include obtaining information about signal transmission rates from the plurality of optical transmitters, wherein in the assigning of the channels, the channels are assigned in further consideration of the obtained information about the signal transmission rates.

In the assigning of the channels, the channels may be assigned such that optical signals having small differences in their transmission rates are placed adjacent to one another.

In another general aspect, there is provided an optical transmission apparatus for transmitting a plurality of optical signals through a single optical fiber using a wavelength-division-multiplexed scheme, the optical transmission apparatus including: a plurality of optical transmitters, each processing an optical signal to be transmitted according to a predetermined signal modulation scheme and a signal transmission rate and outputting the processed optical signal; and a channel assignment unit to obtain information about the signal modulation scheme and the signal transmission rate from each of the respective optical transmitters and assigning channels to the optical transmitters in consideration of the obtained information.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein.

Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
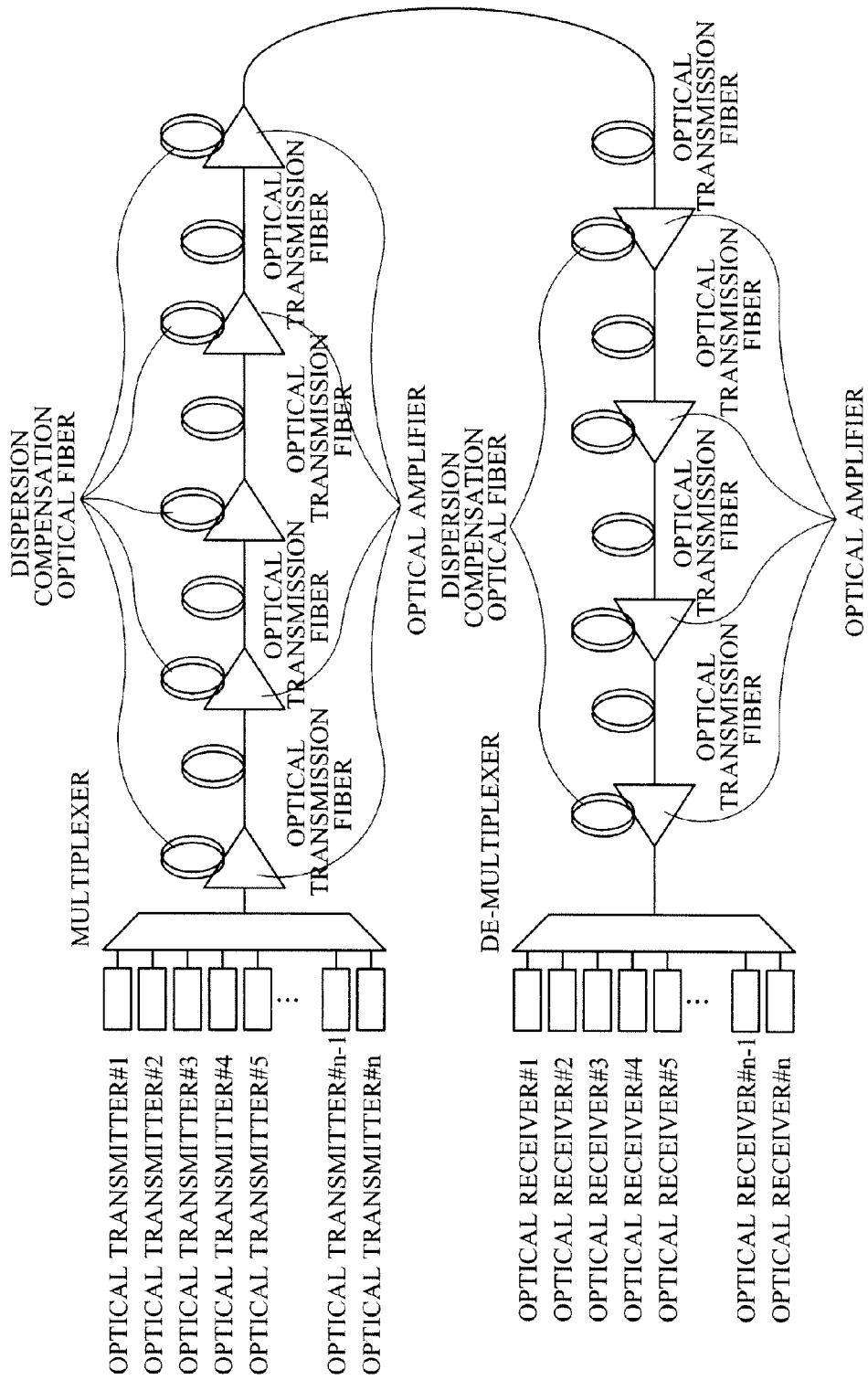
FIG. 1 is a diagram illustrating a general wavelength-division-multiplexed optical transmission system.

FIG. 1 is a diagram illustrating a general wavelength-division-multiplexed optical transmission system. The optical transmission system includes a transmitting part and a receiving part. The transmitting part includes a plurality of optical transmitters and at least one multiplexer. Correspondingly, the receiving part includes a plurality of optical receivers and at least one demultiplexer. The optical transmitters transmit optical signals of different wavelengths, and the signals are multiplexed by the multiplexer and then input through an optical transmission fiber to an optical amplifier. The optical amplifier compensates for chromatic dispersion generated in the optical transmission fiber by use of a dispersion optical fiber. The optical signals passing through the plurality of optical amplifiers and the transmission optical fiber are received by the receiving part. The demultiplexer of the receiving side divides the input optical signals based on their channels and output the divided optical signals through corresponding optical receivers.

Generally, the optical transmitter employs two types of optical signal modulation: one is amplitude modulation, and the other is phase modulation. The amplitude modulation may include non-return-to-zero (NRZ), return-to-zero (RZ), and carrier suppressed RZ (CS-RZ), and the phase modulation may include phase shift key (PSK) and quaternary PSK (QPSK). Additionally, PSK and QPSK may be classified in detail into differential PSK (DPSK) and a differential QPSK (DQPSK), respectively, for coding an optical signal using information between neighboring bits in the phase modulation. The amplitude modulation such as NRZ, RZ, and CS-RZ is performed on a low-speed signal of about 10 Gb/s, and the phase modulation such as PSK and QPSK is performed on a high-speed signal of more than 40 Gb/s.

Figure 2:
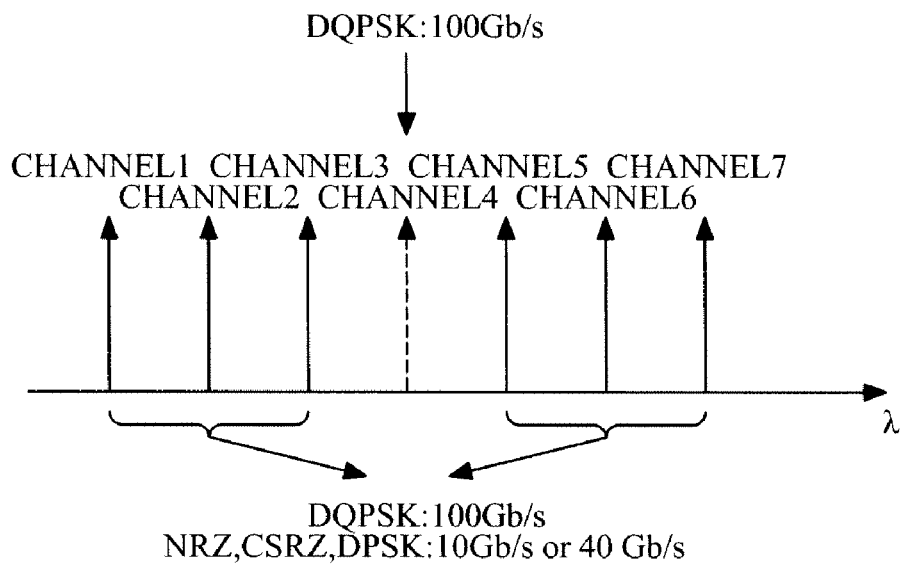
FIG. 2 is a diagram illustrating a channel configuration for the optimal channel assignment in the wavelength-division-multiplexed optical transmission system.

FIG. 2 is a diagram illustrating a channel configuration for the optimal channel assignment in the wavelength-division-multiplexed optical transmission system as illustrated in FIG. 1. FIG. 2 illustrates an example of channel setting to show the difference between channel performance when signals of different modulation formats and different transmission rates are transmitted in the wavelength-division-multiplexed optical transmission system. It is assumed that a signal of 100 Gb/s in a DQPSK format is transmitted through a channel 4 placed in the middle and depicted by a dotted line in FIG. 2. In addition, it is assumed that channels 1, 2, and 3 and channels 5, 6, and 7 which induce nonlinearity are signals of 100 Gb/s in a DQPSK format, or signals of 10 Gb/s or 40 Gb/s in either a NRZ, CS-RZ, or DPSK format. In this case, the channels 1, 2, 3, 5, 6, and 7, i.e. all channels except for channel 4, have the same transmission rate and modulation format.

Figure 3:
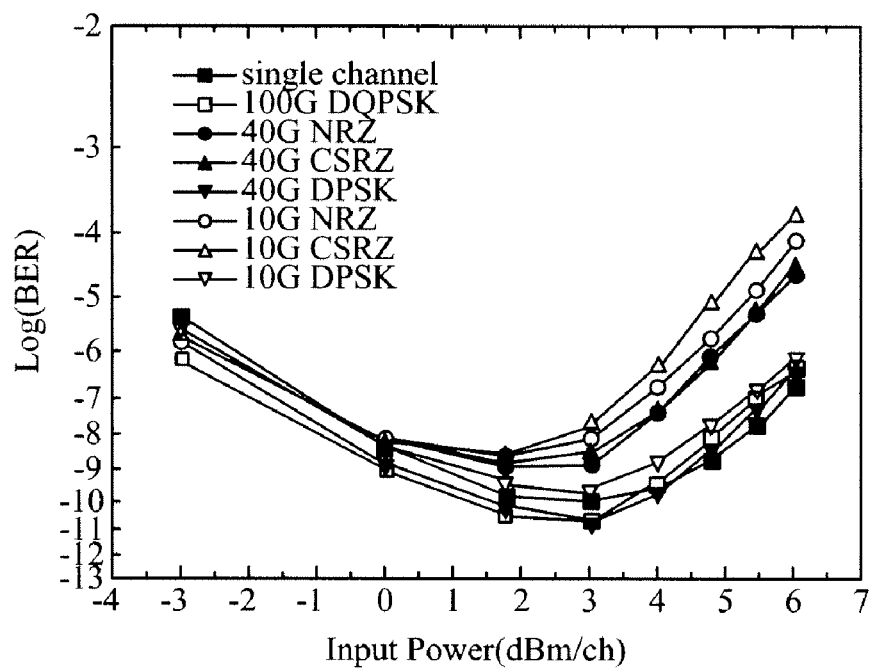
FIG. 3 is a graph illustrating performance of the channel 4 of FIG. 2 after transmission of a 640 km signal.

FIG. 3 is a graph illustrating performance of the channel 4 after a 640 km transmission of a signal in relation with the power per channel. In each channel, the least bit-error rate (BER) is detected near 3 dBm. The performance is most superior when only the channel 4 (single channel) is transmitted, and the channel of 100 Gb/s in DQPSK format or the channel of 40 Gb/s in DPSK has a similar performance as the single channel. However, the amplitude-modulated optical signal in NRZ or CS-RZ format has inferior performance to the phase-modulated optical signal in DQPSK or DPSK format. Moreover, the performance of the channel 4 is inferior when the signal of 10 Gb/s is placed near the signal of 100 Gb/s compared to when the signal of 40 Gb/s is placed near the signal of 100 Gb/s. Thus, it can be understood that the performance to of signals of different transmission rates and different modulation formats can be improved when phase-modulated signals are placed adjacent to one another and when signals are placed in the order of transmission rates in a manner that a signal of the second highest transmission rate is placed adjacent to a signal of the highest transmission rate.

Figure 4:
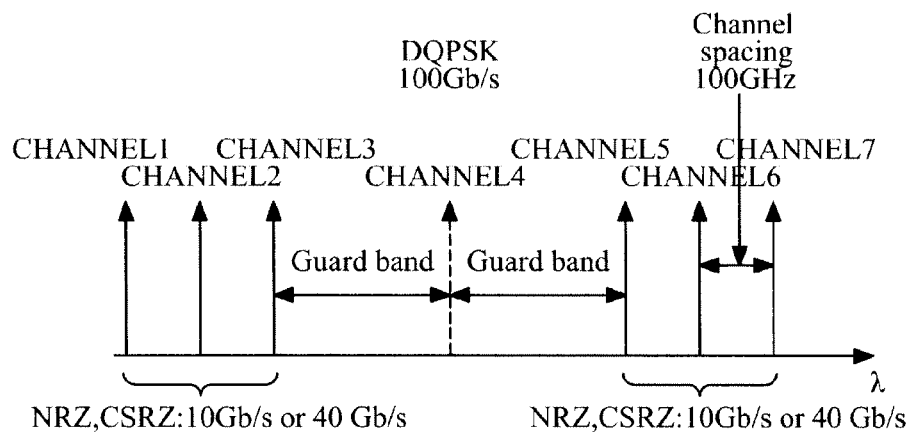
FIG. 4 is a diagram illustrating change in performances of channels when guard bands are established to improve a performance of a channel having a higher transmission rate.

FIG. 4 is a diagram illustrating changes in performances of channels when guard bands are established at each side of a channel having a higher transmission rate to improve a performance of the channel.

Similar to FIG. 2, in FIG. 4, it is assumed that a channel 4 is a signal of 100 Gb/s in a DQPSK format and channels 1, 2, 3, 5, 6, and 7 (also referred to as "other channels") are signals of 10 Gb/s or 40 Gb/s in an NRZ or a CS-RZ format which causes significant performance deterioration. Additionally, it is assumed that an interval between signals excluding the guard bands is 100 GHz.

Figure 5:
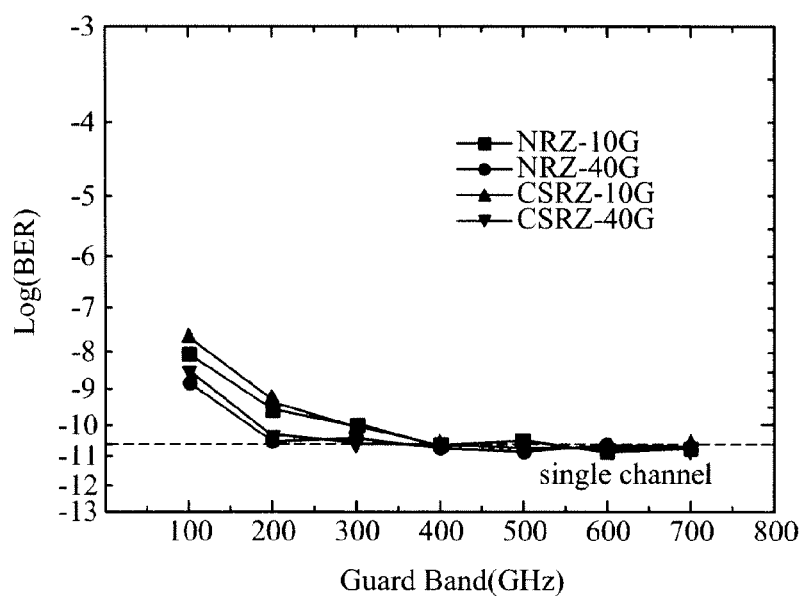
FIG. 5 is a graph illustrating change in performances of channels according to setting of the guard band of FIG. 4.

FIG. 5 is a graph illustrating change in performances of channels according to setting of the guard band of FIG. 4.

When the channels 1, 2, 3, 5, 6, and 7 are signals of 40 Gb/s and guard bands of about 200 GHz are established at each side of channel 4, the bit error rate (BER) of the other channels are similar to the BER of the single channel (channel 4). Also, even when the other channels are signals of 10 Gb/s, if the guard bands of about 400 GHz are established, the BER of the other channels are similar to that of the single channel. That is, when neighboring channels are 40 Gb/s, if channels next to each side of the channel of the highest transmission rate are arranged to be empty, the performance of a signal of 100 Gb/s can be remarkably improved.

Figure 6:
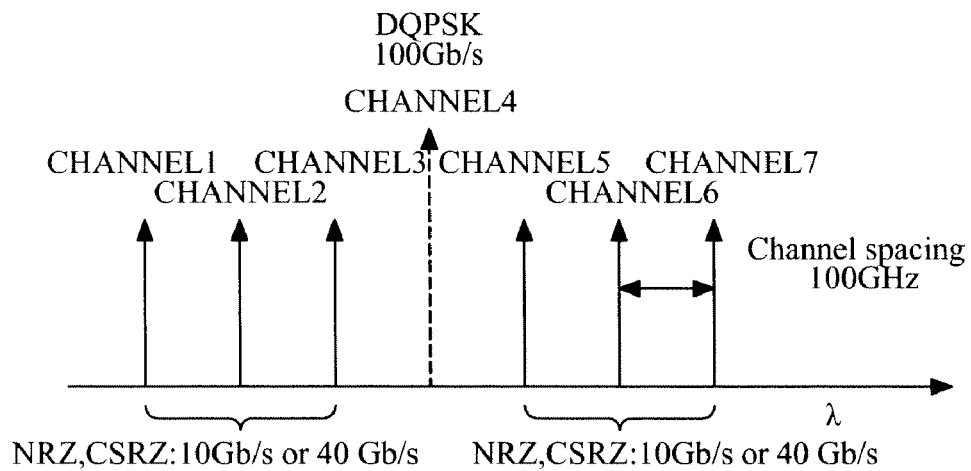
FIG. 6 is a diagram illustrating channel set which reduces power in channels adjacent to a channel of a higher transmission rate to improve a performance of the channel.

FIG. 6 is a diagram illustrating a channel set which reduces power in channels adjacent to a channel of a higher transmission rate to improve a performance of the channel.

Similar to FIG. 2, it is assumed that a channel 4 is a signal of 100 Gb/s in a DQPSK format. Additionally, it is assumed that channels 1, 2, 3, 5, 6, and 7 are amplitude-modulated signals in an NRZ or a CSRZ format, which causes significant performance deterioration. Moreover, it is assumed that power of the channel 4 is reduced to 3 dBm and power is reduced in the remaining channels.

Figure 7:
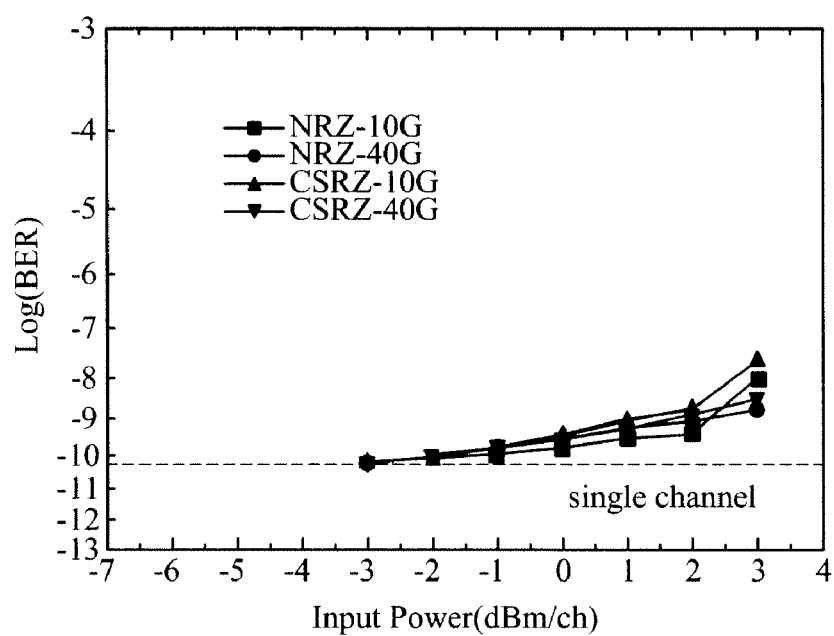
FIG. 7 is a graph illustrating change in performance of a channel in relation with reduction of power of neighboring channels.

FIG. 7 is a graph illustrating change in performance of a channel in relation with reduction of power of neighboring channels.

When power is reduced by 4 dBm, from 3 dBm to −1 dBm, in the channels 1, 2, 3, 5, 6, and 7, i.e. all channels except for channel 4, the performance of the channels becomes similar to the performance of a single channel. Since a signal of 10 Gb/s or a signal of 40 Gb/s requires a lower optical signal noise rate than a signal of 100 Gb/s does, the signal can be transmitted the same distance as the channel of a higher transmission rate when the power is reduced in the channel of the lower transmission rate.

The method of establishing guard bands and the method of reducing power of neighboring channels described with reference to FIGS. 4 to 7 can enhance the performance of a channel with a relatively high transmission rate even when the neighboring channels are phase-modulated signals, as well as even when the neighboring channels are amplitude-modulated signals. The two methods can be used separately or simultaneously.

Figure 8:
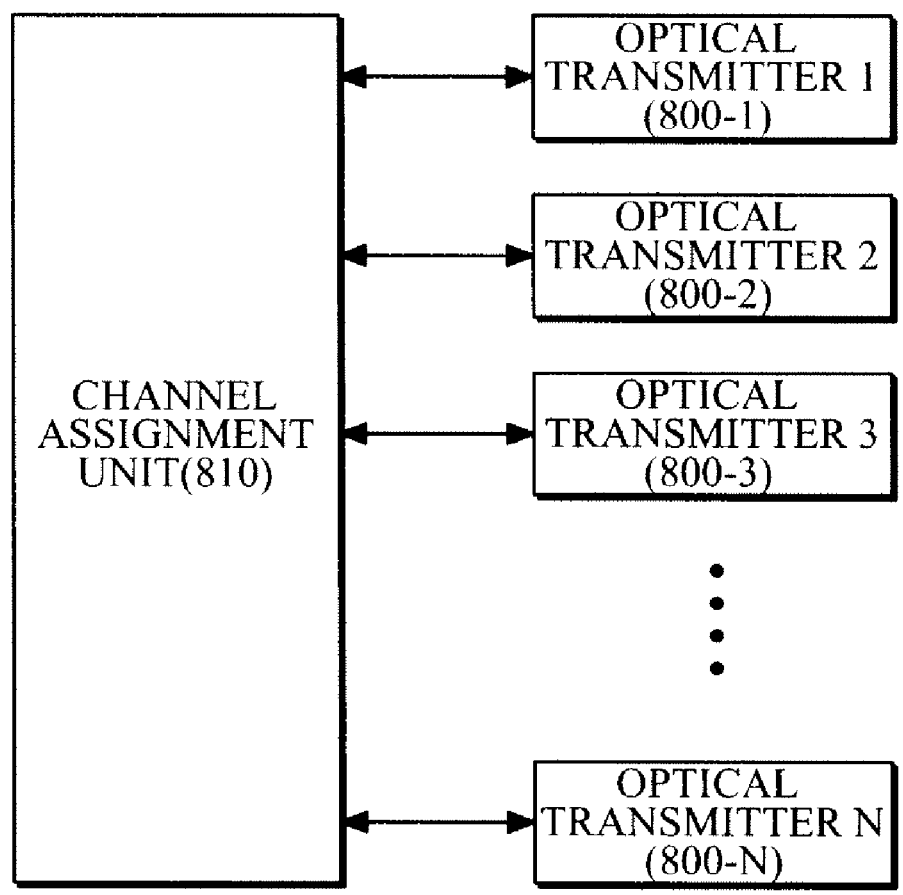
FIG. 8 is a block diagram illustrating an optical transmission apparatus according to an exemplary embodiment.

FIG. 8 is a block diagram illustrating an optical transmission apparatus according to an exemplary embodiment.

A plurality of optical transmitters 800-1, 800-2, . . . , and 800-N modulate signals according to predetermined signal modulation schemes and transmission rates, respectively, and then transmit the modulated signals at corresponding transmission rates. Each optical transmitter may be implemented in the form of a card. Additionally, each optical transmitter is connected to a substrate of the optical transmission apparatus to provide information about a signal modulation scheme and a transmission rate, which is stored in a memory inside the optical transmitter, to a channel assignment unit 810.

The channel assignment unit 810 allocates a channel to each of the optical transmitters 800-1, 800-2, . . . , and 800-N. In one exemplary embodiment, the channel assignment unit 810 is a routing and wavelength assignment (RWA) unit. The channel assignment unit 810 receives the information about a signal modulation scheme and a transmission rate from the respective optical transmitters 800-1, 800-2, . . . , and 800-N. Then, the channel assignment unit 810 assigns a channel to each optical transmitter based on the received information about a signal modulation scheme and a transmission rate from the respective optical transmitters.

Specifically, the channel assignment unit 810 assigns channels to the respective optical transmitters 800-1, 800-2, . . . , and 800-N in consideration of signal modulation schemes of the optical transmitters 800-1, 800-2, . . . , and 800-N. In detail, the channel assignment unit 810 assigns the channels such that phase-modulated signals can be placed at neighboring channels. Additionally, the channel assignment unit 810 assigns channels in consideration of the transmission rates. In specific, the channel assignment unit 810 identifies the transmission rates of the respective optical transmitters 800-1, 800-2, . . . , and 800-N, and then assigns a channel to each optical transmitter, wherein the assigned channel neighbors a channel assigned to a given optical transmitter which has a higher transmission rate than the identified transmission rate of the optical transmitter corresponding to the assigned channel. Therefore, the phase-modulated signals can be placed adjacent to one another, and the signals are placed in the order of the transmission rates in a manner that a signal of the second highest transmission rate can be placed next to the signal of the highest transmission rate, so that the performances of the signals of different transmission rates and modulation schemes can be improved.

Furthermore, when a particular optical transmitter 800-2 has a higher transmission rate than the other optical transmitters, the channel assignment unit 810 establishes guard bands between a channel assigned to the particular optical transmitter 800-2 and neighboring channels at each side of the channel. Alternatively, the channel assignment unit 810 reduces power in the right and left neighboring channels of the channel assigned to the particular optical transmitter 100-2. Such establishment of guard bands or reduction of power in the neighboring channels produces improvement of a performance of a channel of a higher transmission rate. That is, a channel of a higher transmission rate can be improved by establishing guard bands or reducing power in neighboring channels, if necessary.

Figure 9:
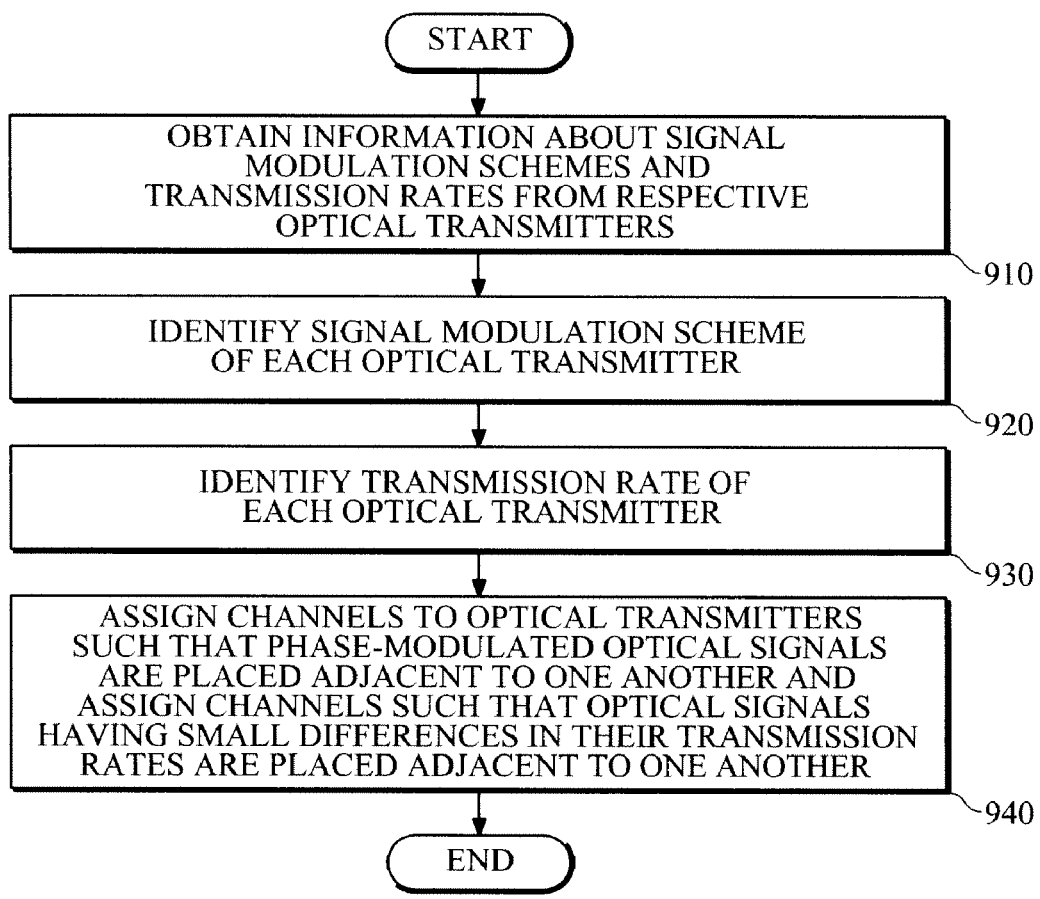
FIG. 9 is a flowchart illustrating a method of assigning channel according to an exemplary embodiment.

FIG. 9 is a flowchart illustrating a method of assigning channel according to an exemplary embodiment. The channel assignment method will be described with reference to FIG. 9 in conjunction with FIG. 8.

The channel assignment unit 810 obtains information about a signal phase modulation scheme and a transmission rate from the respective optical transmitters 800-1, 800-2, . . . , and 800-N in operation 910. Then, the channel assignment unit 810 identifies the information about a signal phase modulation scheme of each optical transmitter in operation 920. Additionally, the channel assignment unit 810 identifies the information about a transmission rate of each optical transmitter in operation 930. Based on the identified information, the channel assignment unit 810 assigns channels to the respective optical transmitters 800-1, 800-2, . . . , and 800-N such that phase-modulated signals are placed adjacent to one another and signals having small differences in their transmission rates are placed adjacent to one another in operation 940. In channel assignment, the channel assignment unit 810 may take into consideration whether or not signals are phase-modulated as a first condition, and then the information about the transmission rate of the optical transmitters as an additional condition. That is, the channel assignment unit 810 checks whether signals are phase-modulated, and then assigns the channels such that the phase-modulated signals are placed adjacent to one another by secondarily taking into account the transmission rates.

In addition, when the particular optical transmitter 800-2 has a higher transmission rate than the other optical transmitters, in channel assignment, the channel assignment unit 810 may to establish guard bands between a channel assigned to the particular optical transmitter 800-2 and the left and right channels of the particular channel. Alternatively, the channel assignment unit 810 reduces power in the left and the right channels of the channel assigned to the particular channel 800-2, or establishes the guard bands and reduces power in the neighboring channels simultaneously.

Accordingly, in a wavelength-division-multiplexed transmission system, the channel assignment apparatus and method can minimize cross-phase modulation, thereby suppressing interference between channels and improving transmission performance, and can primarily ensure performance of a channel through which large amount data is transmitted when channels of different transmission rates and modulation formats are transmitted.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A channel assignment method in an optical transmission system in which a plurality of optical signals are transmitted through a single optical fiber using a wavelength-division-multiplexed scheme, the channel assignment method comprising:
    obtaining information about signal modulation schemes from a plurality of optical transmitters; and
    assigning channels to the respective optical transmitters using the obtained information about the signal modulation schemes.

2. The channel assignment method of claim 1, wherein in the assigning of the channels, the channels are assigned such that phase-modulated optical signals are placed adjacent to one another.

3. The channel assignment method of claim 2, further comprising:
    obtaining information about signal transmission rates from the plurality of optical transmitters,
    wherein in the assigning of the channels, the channels are assigned in further consideration of the obtained information about the signal transmission rates.

4. The channel assignment method of claim 3, wherein in the assigning of the channels, the channels are assigned such that optical signals having small differences in their transmission rates are placed adjacent to one another.

5. The channel assignment method of claim 4, wherein in the assigning of the channels, the channels are primarily assigned such that phase-modulated optical signals are placed adjacent to one another and secondarily the channels are assigned such that optical signals having small difference in their transmission rates are placed adjacent to one another.

6. The channel assignment method of claim 5, wherein the assigning of the channels comprises establishing guard bands at each side of a channel assigned to an optical transmitter having a higher transmission rate than the other optical transmitters.

7. The channel assignment method of claim 5, wherein the assigning of the channels comprises reducing power in channels adjacent to a channel assigned to an optical transmitter having a higher transmission rate than the other optical transmitters.

8. An optical transmission apparatus for transmitting a plurality of optical signals through a single optical fiber using a wavelength-division-multiplexed scheme, the optical transmission apparatus comprising:
    a plurality of optical transmitters, each processing an optical signal to be transmitted according to a predetermined signal modulation scheme and a signal transmission rate and outputting the processed optical signal; and
    a channel assignment unit to obtain information about the signal modulation scheme and the signal transmission rate from each of the respective optical transmitters and assigning channels to the optical transmitters using, the obtained information.

9. The optical assignment apparatus of claim 8, wherein the channel assignment unit assigns the channels such that phase-modulated optical signals are placed adjacent to one another.

10. The optical assignment apparatus of claim 8, wherein the channel assignment unit assigns the channels such that optical signals having small differences in their transmission rates are placed adjacent to one another.

11. The optical assignment apparatus of claim 10, wherein the channel assignment unit establishes guard bands at each side of a channel assigned to an optical transmitter having a higher transmission rate than the other optical transmitters.

12. The optical assignment apparatus of claim 10, wherein the channel assignment unit reduces power in channels adjacent to a channel assigned to an optical transmitter having a higher transmission rate than the other optical transmitters.

13. The optical assignment apparatus of claim 8, wherein the channel assignment unit primarily assigns channels such that phase-modulated signals are placed adjacent to one another and secondarily assigns the channels such that optical signals having small differences in their transmission rates are placed adjacent to one another.

* * * * *